US009282330B1

(12) United States Patent (10) Patent No.: US 9,282,330 B1
Chechik et al. (45) Date of Patent: Mar. 8, 2016

(54) METHOD AND APPARATUS FOR DATA COMPRESSION USING CONTENT-BASED FEATURES

(71) Applicant: Google Inc., Mountain View, CA (US)

(72) Inventors: Gal Chechik, Los Altos, CA (US); Xiaoquan Yi, Mountain View, CA (US); Hrishikesh Aradhye, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/301,309

(22) Filed: Jun. 10, 2014

Related U.S. Application Data

(63) Continuation of application No. 13/182,136, filed on Jul. 13, 2011, now Pat. No. 8,787,454.

(51) Int. Cl.
*H04N 7/12* (2006.01)
*H04N 19/23* (2014.01)

(52) U.S. Cl.
CPC .................................. *H04N 19/004* (2013.01)

(58) Field of Classification Search
CPC ....... C08G 77/20; G03F 7/40; H01L 21/0337; H01L 21/0338; H01L 21/3121; G01T 1/17; H04N 5/32; H04N 19/115; H04N 19/136; H04N 19/154; H04N 7/50; H04N 7/26643; H04N 7/26638; H04N 7/26276; H04N 7/26271; H04N 19/00442; H04N 19/00321; H04N 7/26686; H04N 21/63; G06F 17/30026; G06F 21/10; G06T 9/20
USPC ...................................................... 375/240.08
See application file for complete search history.

(56) References Cited

U.S. PATENT DOCUMENTS

| | | | |
|---|---|---|---|
| 5,168,352 A | 12/1992 | Naka et al. | |
| 5,241,382 A | 8/1993 | Paik et al. | |
| 5,402,146 A | 3/1995 | Rodriguez et al. | |
| 5,557,334 A | 9/1996 | Legate | |
| 5,821,997 A | 10/1998 | Kawamura et al. | |
| 5,907,586 A | 5/1999 | Katsuragawa et al. | |
| 5,986,707 A * | 11/1999 | Geshwind | 375/240.01 |
| 6,025,882 A * | 2/2000 | Geshwind | 375/240.26 |
| 6,366,705 B1 * | 4/2002 | Chiu et al. | 382/239 |
| 6,476,805 B1 | 11/2002 | Shum et al. | |
| 6,661,463 B1 * | 12/2003 | Geshwind | 348/384.1 |
| 6,675,158 B1 | 1/2004 | Rising et al. | |
| 6,704,022 B1 | 3/2004 | Aleksic | |
| 6,832,006 B2 | 12/2004 | Savakis et al. | |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Shan Elahi
(74) *Attorney, Agent, or Firm* — Lowenstein Sandler LLP

(57) ABSTRACT

Disclosed herein are methods and apparatuses for compressing a video signal. In one embodiment, the method includes storing a function derived from a set of human ratings in a memory, identifying within at least a portion of the video signal at least one content-based feature, inputting the at least one identified content-based feature into the stored function, determining a compression ratio based on the function using a processor and generating a compressed video signal at the determined compression ratio.

19 Claims, 11 Drawing Sheets

(56) References Cited

U.S. PATENT DOCUMENTS

| | | | |
|---|---|---|---|
| 6,968,012 B1 | 11/2005 | Meggers | |
| 7,296,031 B1 | 11/2007 | Platt et al. | |
| 7,412,425 B2* | 8/2008 | Rifkin et al. | 706/12 |
| 7,613,270 B2 | 11/2009 | Komaili et al. | |
| 7,653,252 B2* | 1/2010 | Hernandez et al. | 382/232 |
| 7,903,737 B2 | 3/2011 | Martinian et al. | |
| 8,131,786 B1 | 3/2012 | Bengio et al. | |
| 8,176,523 B2 | 5/2012 | Kortum et al. | |
| 8,185,403 B2 | 5/2012 | Pang et al. | |
| 8,284,837 B2 | 10/2012 | Yin et al. | |
| 8,463,719 B2 | 6/2013 | Lyon et al. | |
| 8,787,454 B1* | 7/2014 | Chechik et al. | 375/240.08 |
| 2001/0003813 A1 | 6/2001 | Sugano et al. | |
| 2002/0114455 A1 | 8/2002 | Asahi et al. | |
| 2002/0136396 A1 | 9/2002 | Witty et al. | |
| 2002/0176353 A1 | 11/2002 | Atlas et al. | |
| 2003/0033347 A1 | 2/2003 | Bolle et al. | |
| 2003/0059121 A1* | 3/2003 | Savakis et al. | 382/239 |
| 2003/0133505 A1 | 7/2003 | Koyanagi | |
| 2003/0169934 A1 | 9/2003 | Naito | |
| 2003/0221541 A1 | 12/2003 | Platt | |
| 2004/0120594 A1* | 6/2004 | Vitali et al. | 382/251 |
| 2004/0125877 A1 | 7/2004 | Chang et al. | |
| 2004/0179110 A1* | 9/2004 | Hashimoto | 348/222.1 |
| 2004/0190633 A1 | 9/2004 | Ali et al. | |
| 2005/0063472 A1* | 3/2005 | Vella et al. | 375/240.22 |
| 2006/0029364 A1 | 2/2006 | Kosugi | |
| 2006/0092282 A1 | 5/2006 | Herley et al. | |
| 2006/0235812 A1* | 10/2006 | Rifkin et al. | 706/14 |
| 2006/0269161 A1 | 11/2006 | Ramsay et al. | |
| 2007/0019729 A1* | 1/2007 | Nakagomi et al. | 375/240.13 |
| 2007/0093716 A1 | 4/2007 | Radulescu | |
| 2007/0121722 A1 | 5/2007 | Martinian et al. | |
| 2007/0133679 A1 | 6/2007 | Yang et al. | |
| 2007/0146553 A1 | 6/2007 | Mori et al. | |
| 2007/0171982 A1 | 7/2007 | Meggers | |
| 2007/0242138 A1* | 10/2007 | Manico et al. | 348/231.3 |
| 2007/0280350 A1 | 12/2007 | Mathew et al. | |
| 2008/0059159 A1 | 3/2008 | Komaili et al. | |
| 2008/0165861 A1* | 7/2008 | Wen et al. | 375/240.26 |
| 2008/0228576 A1 | 9/2008 | Yonezaki | |
| 2010/0027663 A1 | 2/2010 | Dai et al. | |
| 2010/0061461 A1* | 3/2010 | Bankoski et al. | 375/240.16 |
| 2010/0098155 A1* | 4/2010 | Demircin et al. | 375/240.02 |
| 2010/0166069 A1 | 7/2010 | Goel | |
| 2010/0172404 A1* | 7/2010 | Isnardi et al. | 375/240.01 |
| 2010/0260268 A1 | 10/2010 | Cowan et al. | |
| 2011/0087673 A1 | 4/2011 | Chen et al. | |
| 2011/0119212 A1* | 5/2011 | De Bruin et al. | 706/12 |
| 2011/0150085 A1 | 6/2011 | Andrijanic et al. | |
| 2011/0299721 A1 | 12/2011 | He et al. | |
| 2012/0051440 A1* | 3/2012 | Parfenov et al. | 375/240.26 |
| 2012/0260145 A1* | 10/2012 | Yang et al. | 714/758 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski, et al., "VP8 Data Format and Decoding Guide; drafl-bankoski-vp8-bitstream-02" Network Working Group. Dated May 18, 2011.

Office Action for U.S. Appl. No. 13/182,136, dated Aug. 12, 2013, 93 pages.

Grainer, et al "A Discriminative Kernel-Based Model to Rank Images from Text Queries", Aug. 2008.

Office Action for U.S. Appl. No. 13/182,136, dated Dec. 27, 2013, 45 pages.

Wang, et al, "Rate Scalable Video Coding Using a Foveation-Based Human Visual System Model," 2001.

Ong, et al, "Perceptual Quality Metric for H.264 Low Bit Rate Videos," 2006.

Notice of Allowance for U.S. Appl. No. 13/182,136, dated Mar. 10, 2014, 12 pages.

* cited by examiner

| CONTENT CLASSIFICATION | HUMAN RATING | BIT RATE [Kbits/S] |
|---|---|---|
| VIDEO 1 | 1 | 128 |
| | 5 | 256 |
| | 7 | 512 |
| | 10 | 1024 |
| VIDEO 2 | 6 | 128 |
| | 7 | 256 |
| | 8 | 512 |
| | 9 | 1024 |
| VIDEO 3 | 1 | 128 |
| | 2 | 256 |
| | 8 | 512 |
| | 10 | 1024 |
| VIDEO 4 | 4 | 128 |
| | 5 | 256 |
| | 5 | 512 |
| | 6 | 1024 |
| VIDEO 5 | 5 | 128 |
| | 6 | 256 |
| | 7 | 512 |
| | 8 | 1024 |

FIG. 6

METHOD AND APPARATUS FOR DATA COMPRESSION USING CONTENT-BASED FEATURES

CROSS-REFERENCE TO RELATED APPLICATIONS

This application is a continuation of U.S. patent application Ser. No. 13/182,136, filed Jul. 13, 2011, and entitled, "METHOD AND APPARATUS FOR DATA COMPRESSION USING CONTENT-BASED FEATURES," the entirety of which is incorporated herein by reference.

TECHNICAL FIELD

The present invention relates in general to video encoding.

BACKGROUND

In many lossy compression schemes of audio and video, the strength of the compression can be selected to achieve a compression level that is perceptually acceptable to the human visual system (HVS). Because the human visual system is complex, it is difficult to select an optimal compression level. On one hand, it is desirable to compress an image into a relatively small number of bits, thus reducing the bandwidth required to transmit the image. On the other hand, some compression schemes can result in a reduced image quality as perceived by the HVS if the image is compressed at too high a compression ratio.

SUMMARY

Methods and apparatuses for encoding a video signal are disclosed herein.

In accordance with one aspect of the disclosed embodiments, a method for compressing a video signal includes storing a function derived from a set of ratings in a memory, identifying within at least a portion of the video signal at least one content-based feature and inputting the at least one identified content-based feature into the stored function. The method also includes determining a compression ratio based on the function using a processor and compressing the portion of the video signal having identified content-based features at the at the determined compression ratio.

In accordance with another aspect of the disclosed embodiments, an apparatus for compressing a video signal is provided. The apparatus comprises a memory with a function derived from a set of human ratings stored thereon and a processor configured to execute instructions stored in the memory to identify within at least a portion of the video signal at least one content-based feature, input the at least one identified content-based feature into the stored function, determine a compression ratio based on the function using a processor and compress the portion of the video signal having identified content-based features.

In accordance with yet another aspect of the disclosed embodiments, an apparatus for compressing a video signal is provided. The apparatus comprises means for storing a function derived from a set of ratings in a memory, means for identifying within at least a portion of the video signal at least one content-based feature and means for inputting the at least one identified content-based feature into the stored function. The apparatus also includes means for determining a compression ratio based on the function and means for compressing the portion of the video signal having identified content-based features at the determined compression ratio.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein:

FIG. 6 is a schematic diagram of a table of human perception ratings for several video content-based features rated relative to varying bit rates;

DETAILED DESCRIPTION

Embodiments are disclosed herein in which a function is used to predict acceptable compression level based on acoustic and/or visual features, given a set of human judgments about perceptual quality of compressed audio or video.

Figure 1:
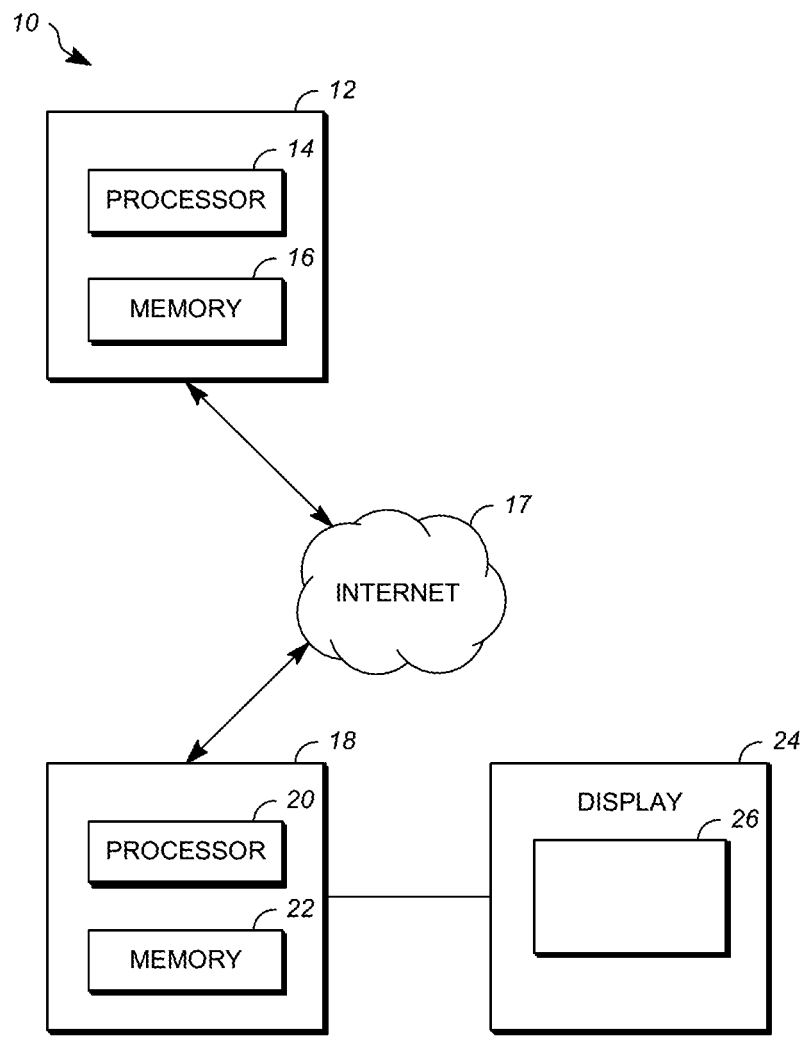
FIG. 1 is a diagram of an encoder and decoder system in accordance with one embodiment.

FIG. 1 is a diagram of an encoder and decoder system 10 for still or dynamic video images. An exemplary transmitting station 12 can be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 can be random access memory (RAM) or any other suitable memory device. Memory 16 can store data and program instructions which are used by the CPU 14. Other suitable implementations of transmitting station 12 are possible.

Figure 2:
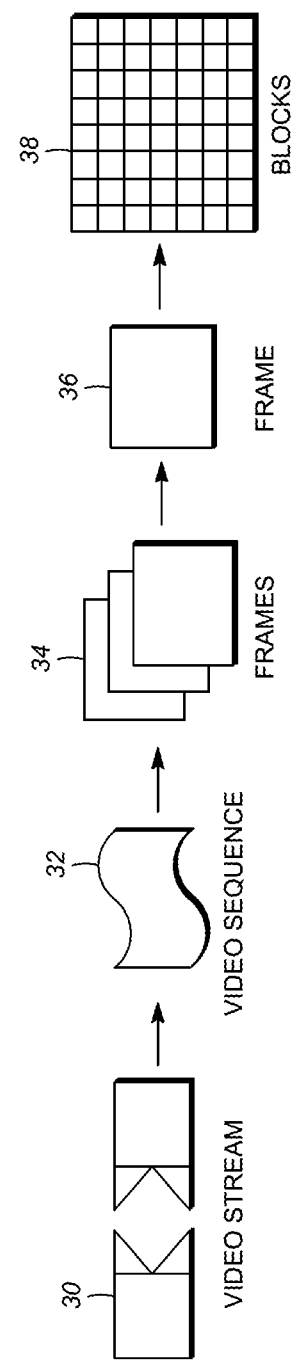
FIG. 2 is a diagram of a video bitstream that can be encoded and decoded by the system of FIG. 1.

Referring to FIG. 2, a video stream 30 can include a number of adjacent video frames (i.e. images) 34, which can be still or dynamic. Adjacent video frames can be further subdivided into a single frame 36. At the next level, the frame can be divided into a series of blocks 38, which includes data corresponding to, for example, a 16×16 block of displayed pixels. Each block can contain luminance and chrominance data for the corresponding pixels. The blocks can also be of any other suitable size such as 16×8 pixel groups, 8×16 pixel groups or 4×4 pixel groups.

A network 17 connects transmitting station 12 and a receiving station 18 for encoding and decoding of the video stream. Specifically, the video stream can be encoded by an encoder in transmitting station 12 and the encoded video stream can be decoded by a decoder 80 in receiving station 18. Network 17 can, for example, be the Internet. Network 17 can also be a local area network (LAN), wide area network (WAN), virtual private network (VPN), or any other means of transferring the video stream from transmitting station 12.

Receiving station 18, in one example, can be a computer having an internal configuration of hardware include a processor such as a central processing unit (CPU) 20 and a memory 22. Processor 20 is a controller for controlling the operations of receiving station 18. CPU 20 can be connected to memory 22 by, for example, a memory bus. Memory 22 can be RAM or any other suitable memory device. Memory 22 stores data and program instructions which are used by CPU 32. Other suitable implementations of receiving station 18 are possible.

A display 24 configured to display a video stream can be connected to receiving station 18. Display 24 can be implemented in various ways, including with a liquid crystal display (LCD) or a cathode-ray tube (CRT). The display 24 can be configured to display a video stream decoded by the decoder in receiving station 18.

Other implementations of the encoder and decoder system 10 are possible. For example, one implementation can omit the network 17 and/or the display 24. In another implementation, a video stream can be encoded and then stored for transmission at a later time by transmitting station 12 or any other device having memory. In another implementation, additional components can be added to the encoder and decoder system 10. For example, a display or a video camera can be attached to transmitting station 12 to capture the video stream to be encoded.

FIG. 2 is a diagram a typical video stream 30 to be encoded and decoded. Video coding formats, such as VP8 or H.264, provide a defined hierarchy of layers for video stream 30. Video stream 30 includes a video sequence 32. At the next level, video sequence 32 consists of a number of adjacent frames 34, which can then be further subdivided into a single frame 36. At the next level, frame 36 can be divided into a series of blocks or macroblocks 38, which can contain data corresponding to, for example, a 16×16 block of displayed pixels 38 in frame 36. Each block can contain luminance and chrominance data for the corresponding pixels. Blocks 38 can also be of any other suitable size such as 16×8 pixel groups, 8×16 pixel groups or 4×4 pixel groups, for example. Herein, unless otherwise stated, the terms macroblocks and blocks are used interchangeably.

Figure 3:
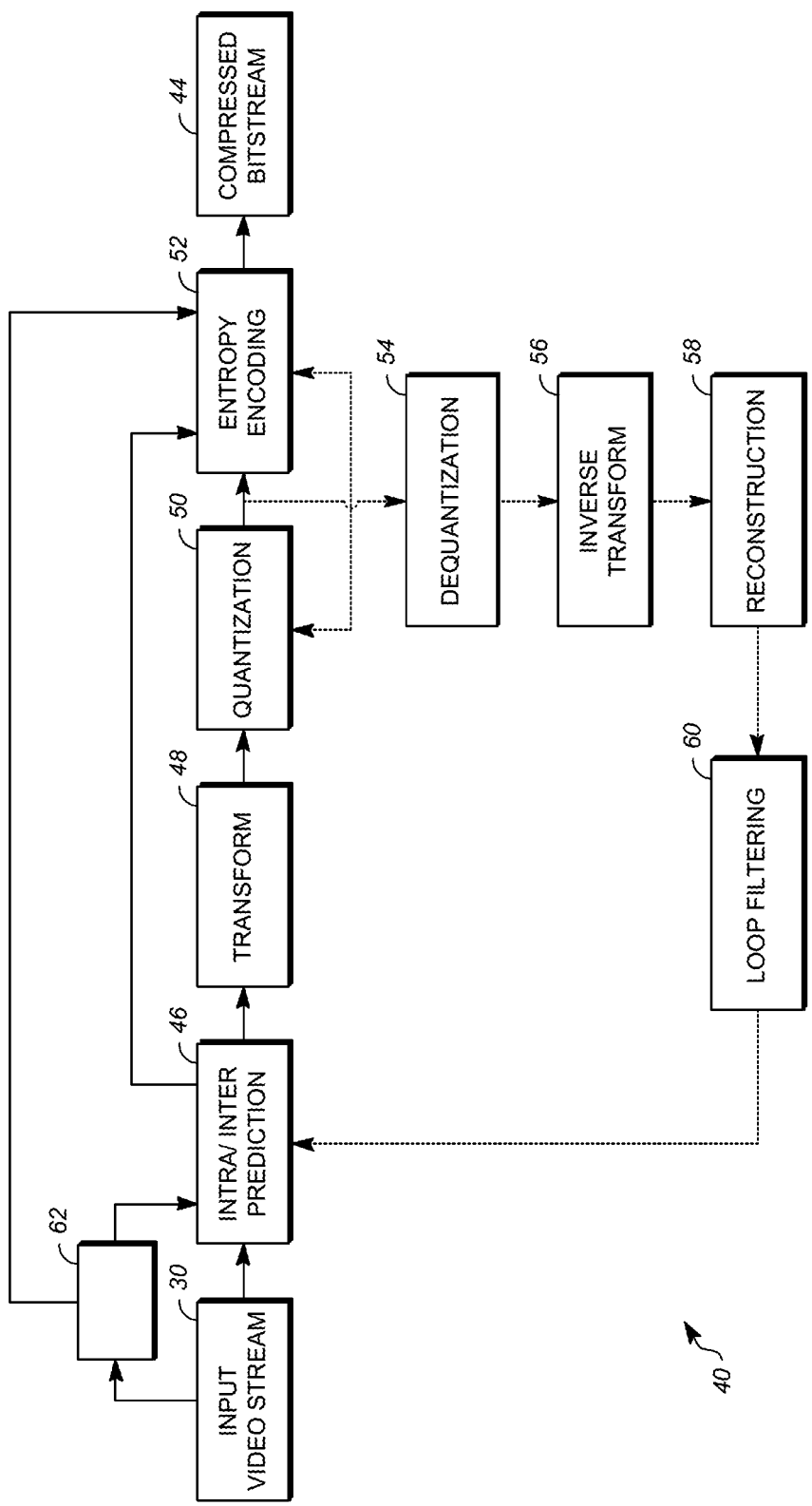
FIG. 3 is a block diagram of an exemplary encoder implemented in the system of FIG. 1.

FIG. 3 is a block diagram of a video compression system in accordance with one embodiment. An encoder 40 encodes an input video stream 30. Encoder 40 has the following stages to perform the various functions in a forward path (shown by the solid connection lines) to produce an encoded or a compressed bitstream 44: an intra/inter prediction stage 46, a transform stage 48, a quantization stage 50 and an entropy encoding stage 52. Encoder 40 also includes a reconstruction path (shown by the dotted connection lines) to reconstruct a frame for encoding of further macroblocks. Entropy encoding stage 52 can also provide feedback to quantization stage 50 to alter quantization or to provide updates to a segmentation map. Encoder 40 has the following stages to perform the various functions in the reconstruction path: a dequantization stage 54, an inverse transform stage 56, a reconstruction stage 58 and a loop filtering stage 60. Other structural variations of encoder 40 can be used to encode input video stream 30. For example, encoder 40 can include a video sequence content-based feature detection stage 62. This stage can include a filter bank to detect various content-based features, for example. The results of the content-based feature detection stage 62 can be sent to memory 16 as input for a stored function used to determine a compression ratio for compressed bitstream 44.

When input video stream 30 is presented for encoding, each frame 34 within input video stream 30 is processed in units of blocks. At intra/inter prediction stage 46, each block can be encoded using either intra-frame prediction (i.e., within a single frame) or inter-frame prediction (i.e. from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames as described in additional detail herein.

Next, still referring to FIG. 3, the prediction block can be subtracted from the current block at stage 46 to produce a residual macroblock (residual). Transform stage 48 transforms the residual into transform coefficients in, for example, the frequency domain, and quantization stage 50 converts the transform coefficients into discrete quantum values, which are referred to as quantized transform coefficients or quantization levels. The quantized transform coefficients are then entropy encoded by entropy encoding stage 52. The entropy-encoded coefficients, together with the information required to decode the macroblock, such as the type of prediction used, motion vectors and quantizer value, are then output to compressed bitstream 44.

The reconstruction path in FIG. 3 is present to ensure that both encoder 40 and a decoder 80 (described below) use the same reference frames to decode compressed bitstream 44. The reconstruction path performs functions that are similar to functions that take place during the decoding process that are discussed in more detail below, including dequantizing the quantized transform coefficients at dequantization stage 54 and inverse transforming the dequantized transform coefficients at an inverse transform stage 56 in order to produce a derivative residual macroblock (derivative residual). At reconstruction stage 58, the prediction macroblock that was predicted at intra/inter prediction stage 46 can be added to the derivative residual to create a reconstructed macroblock. A loop filter 60 can then be applied to the reconstructed macroblock to reduce distortion such as blocking artifacts. Other variations of encoder 40 can be used to encode compressed bitstream 44. For example, a non-transform based encoder can quantize the residual signal directly without transform stage 48.

Figure 4:
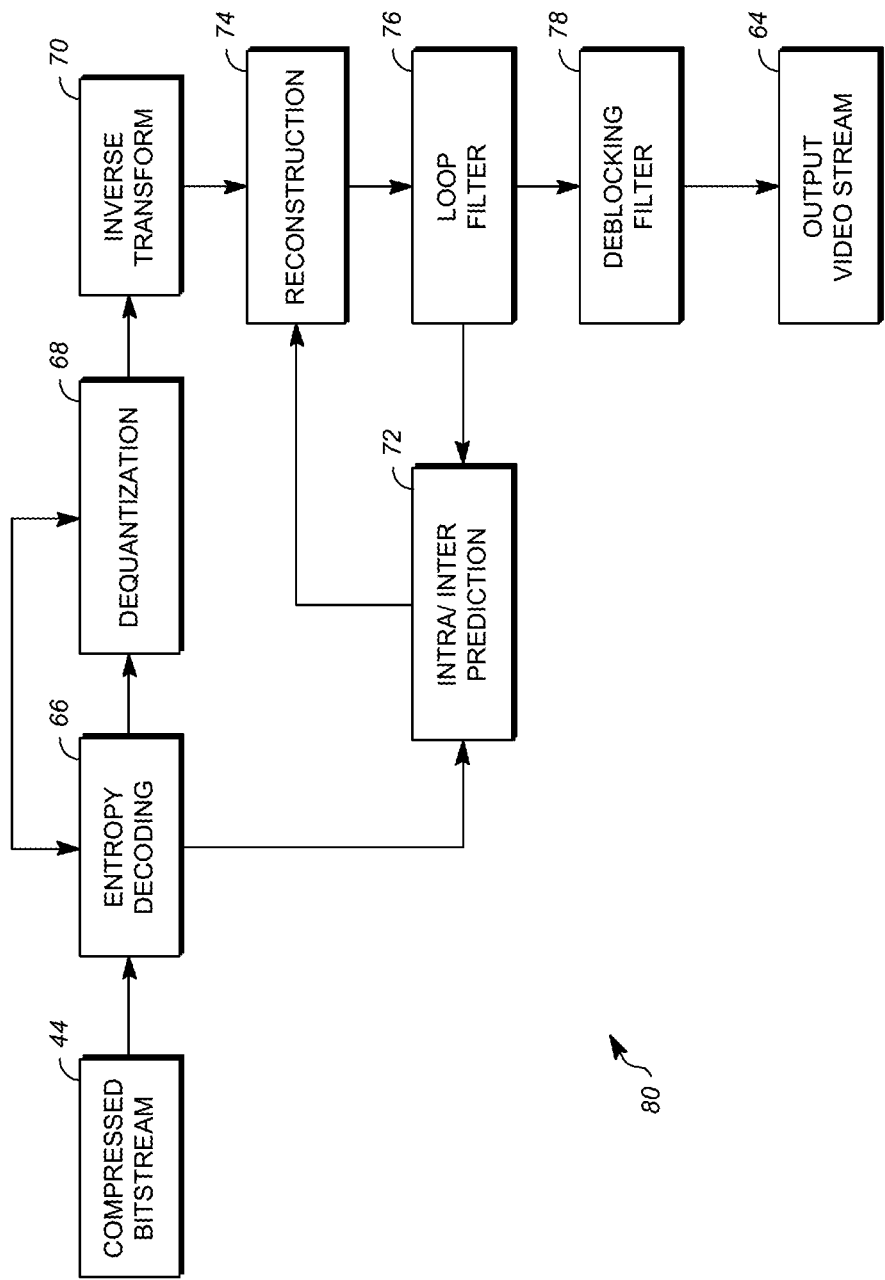
FIG. 4 is a block diagram of an exemplary decoder implemented in the system of FIG. 1.

FIG. 4 is a block diagram of a video decompression system or decoder 80 to decode compressed bitstream 44. Decoder 80, similar to the reconstruction path of the encoder 40 discussed previously, includes the following stages to perform various functions to produce an output video stream 64 from compressed bitstream 44: an entropy decoding stage 66, a dequantization stage 68, an inverse transform stage 70, an intra/inter prediction stage 72, a reconstruction stage 74, a loop filter stage 76 and a deblocking filtering stage 78. Other structural variations of decoder 80 can be used to decode compressed bitstream 44.

When compressed bitstream 44 is presented for decoding, the data elements within compressed bitstream 44 can be decoded by entropy decoding stage 66 (using, for example, Context Adaptive Binary Arithmetic Decoding) to produce a set of quantized transform coefficients. Dequantization stage 68 dequantizes the quantized transform coefficients, and inverse transform stage 70 inverse transforms the dequantized transform coefficients to produce a derivative residual that can be identical to that created by the reconstruction stage in the encoder 40. Using header information decoded from the compressed bitstream 44, decoder 80 can use intra/inter prediction stage 72 to create the same prediction macroblock as was created in encoder 40. At the reconstruction stage 74, the prediction macroblock can be added to the derivative residual to create a reconstructed macroblock. The loop filter 76 can be applied to the reconstructed macroblock to reduce blocking artifacts. Deblocking filter 78 can be applied to the reconstructed macroblock to reduce blocking distortion, and the result is output as output video stream 64. Other variations of decoder 80 can be used to decode compressed bitstream 44. For example, a decoder can produce output video stream 64 without deblocking filtering stage 78.

Figure 5A:
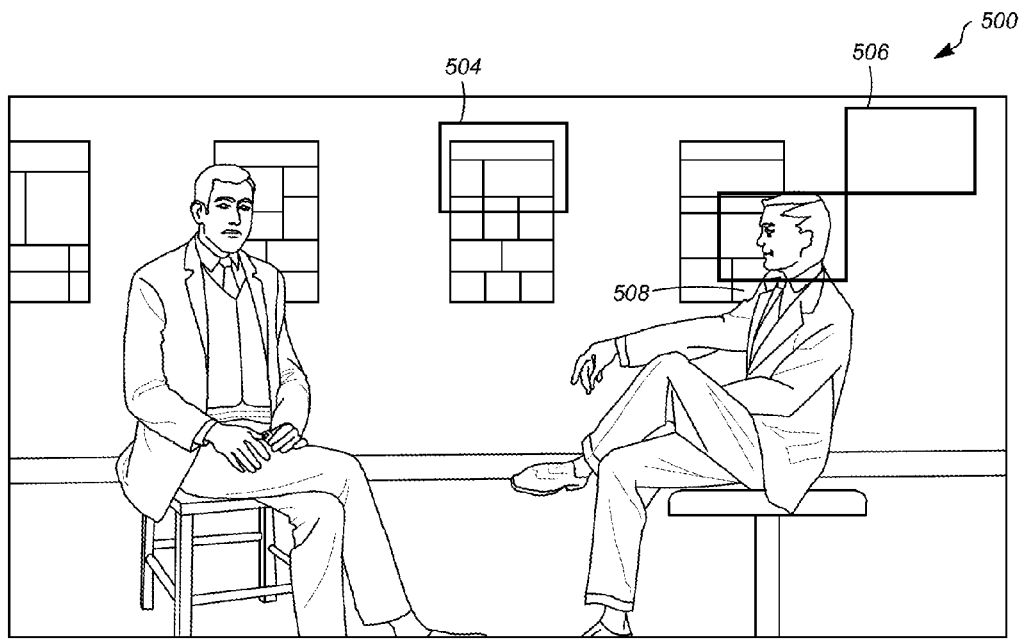
FIG. 5A is a frame of data from a video sequence.
Figure 5B:
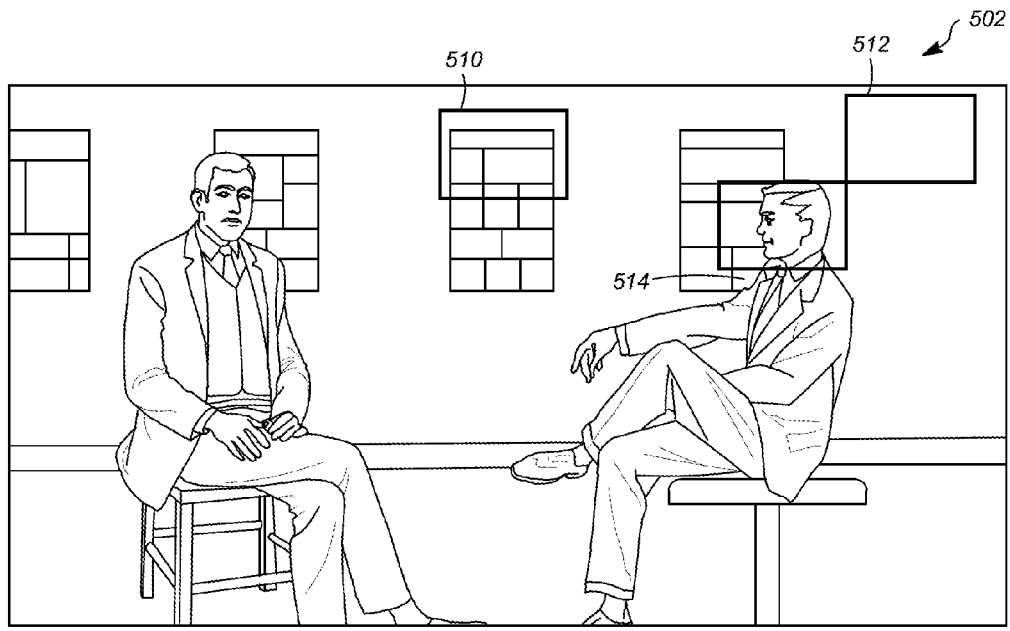
FIG. 5B is another frame of data from a video sequence.

FIGS. 5A and 5B depict another view of the series of frames 34 depicted in FIG. 2. According to one embodiment, a frame, series of frames or segments of pixels within frames can have identifiable video characteristics contained therein. For example, frame 500 can be a first frame in a video stream 30. Frame 500 includes multiple examples of content-based features of a video. One example of a content-based feature that can be identified is high frequency content. For example, of a highly textured segment of pixels is segment 504. Segment 504 can be classified as having high frequency content relative to segment 506 in that segment 504 displays a high rate of change in color and brightness in a small area of pixels compared with segment 504 which is uniform in color and brightness. Other content-based features such as movement can be analyzed inter-frame by looking at multiple frames in the sequence of video frames 34 that make up a video stream 30. For example, frame 502 can be a frame that is temporally subsequent to frame 500. By analyzing corresponding segments or blocks in a sequence of frames, such as segment 506 and segment 512, movement between frames can be detected. Accordingly, the degree of inter-frame movement in a video can be detected as a content-based feature. For example, between frame 500 and frame 502, no movement will be detected between segment 512 and segment 506, while a high degree of movement will be detected between segment 510 and 504.

In addition to high frequency content color, brightness, audio content and movement any other number of detectable video based content features can be detected in a video stream, video frame or frame segment. Identifying various content-based features within video sequences allows a function such as a prediction curve to predict how a human will perceive the quality of those features at various bit rates. Because human perception of each combination of content-based features is impacted more or less severely by video compression, the prediction curve must be able to anticipate a high degree of potential content-based features that can be contained in a video signal. In general, the function of compression is to reduce digitized audio and video to bit rates that can be supported by a channel or to otherwise more efficiently transmit image or video. Higher compression ratios discard more bits from original video content than do lower compression ratios. Higher compression ratios can be achieved by decreasing the frame rate, increasing quantizer step size or any other known method which reduces the number of bits spent to encode a video. In general, the higher a compression ratio is, the lower the quality of reconstructed video is when it is received because fewer bits are used to accurately reconstruct the original video stream. Accordingly, more compression efficiency results in a tradeoff with reduced video quality.

Because of the complexities of the human visual system (HVS), degradation of some audio and video content-based features are perceived more readily than others, affecting a viewers perception of video quality differently for different content-based features contained in a given video. For example, a human viewer can be more likely to perceive an increased compression ratio in a video sequence with a high degree of motion than in a video sequence with a little or no motion. To illustrate this example, in FIGS. 5A and 5B, a viewer can be less likely to perceive a higher compression ratio for segments 506 and 512 than they would for segments 508 and 514 because segments 506 and 512 do not include inter-frame motion or high frequency content. In order to efficiently use limited bandwidth space, encoders that can compress as much as is possible without disturbing viewers experience is desired. However, because of the complexities of the HVS, it is difficult to predict for a given video what types of video content can be maximally compressed without negative perceptual effects.

One way to discover the effect of a compression ratio on human perception is for a set of human evaluators to rate a series of videos with varying content-based characteristics at several different compression ratios. However, implementing such a process for all possible video content features would be prohibitively expensive. One exemplary solution is to collect perceptual quality evaluations from human raters for a limited set of videos with varying content-based features. Each video with its own unique set of content features can be rated by humans at varying compression rates. Content-based features contained in each video can be evaluated by a human for low, medium and high compression ratios, for example. A suitable number of features to be evaluated is 2000, but more or fewer can be selected. The scale used by a human evaluator can be 1-10, 1-5 or any other scale which conveys relative perceived quality. The human evaluation can include human viewers watching a video clip at five different bit rates or compression ratios, for example. Each clip can be evaluated by a group of humans at each compression ratio so that the final human rating is an average of multiple ratings. Any number of ratings, videos and compression ratios can be considered in building the database of human ratings. Generally speaking, the larger the database the more effective the ability to discover acceptable compression ratios in accordance with the disclosed embodiments.

In one exemplary embodiment, FIG. 6 depicts a data table of subjective evaluations collected from human evaluators for five different videos, each with a unique set of content-based features. The list features that contribute to the uniqueness of each video are extremely large and can be on the order of thousands, tens of thousands or more. Only a small subset of such features will be discussed here, but are not meant to limiting. Some examples of content features include spatial frequency, the degree of motion present, particular objects contained in a frame and whether the video contains audio content. In an encoder, each of these features can be analyzed, isolated and detected as a type of data.

With respect to FIG. 6, bit rates of 128, 256, 512 and 1024 Kb/S were chosen at random and any number of bit rates can be selected. Furthermore, each bit rate could also correspond to a compression ratio. For example, video 1 with a human rating of 1 can have a compression ratio of 4, while video 1 with a human rating of 10 can have a compression ratio of 1 as four times as many bits are used to represent video signal 1. Accordingly, for each video, a human rater can indicate a rating for each of the bit rates or compression ratios. Furthermore, each video can be evaluated by dozens of humans so that the "Human Rating" is an average of all evaluators for that video.

Figure 7:
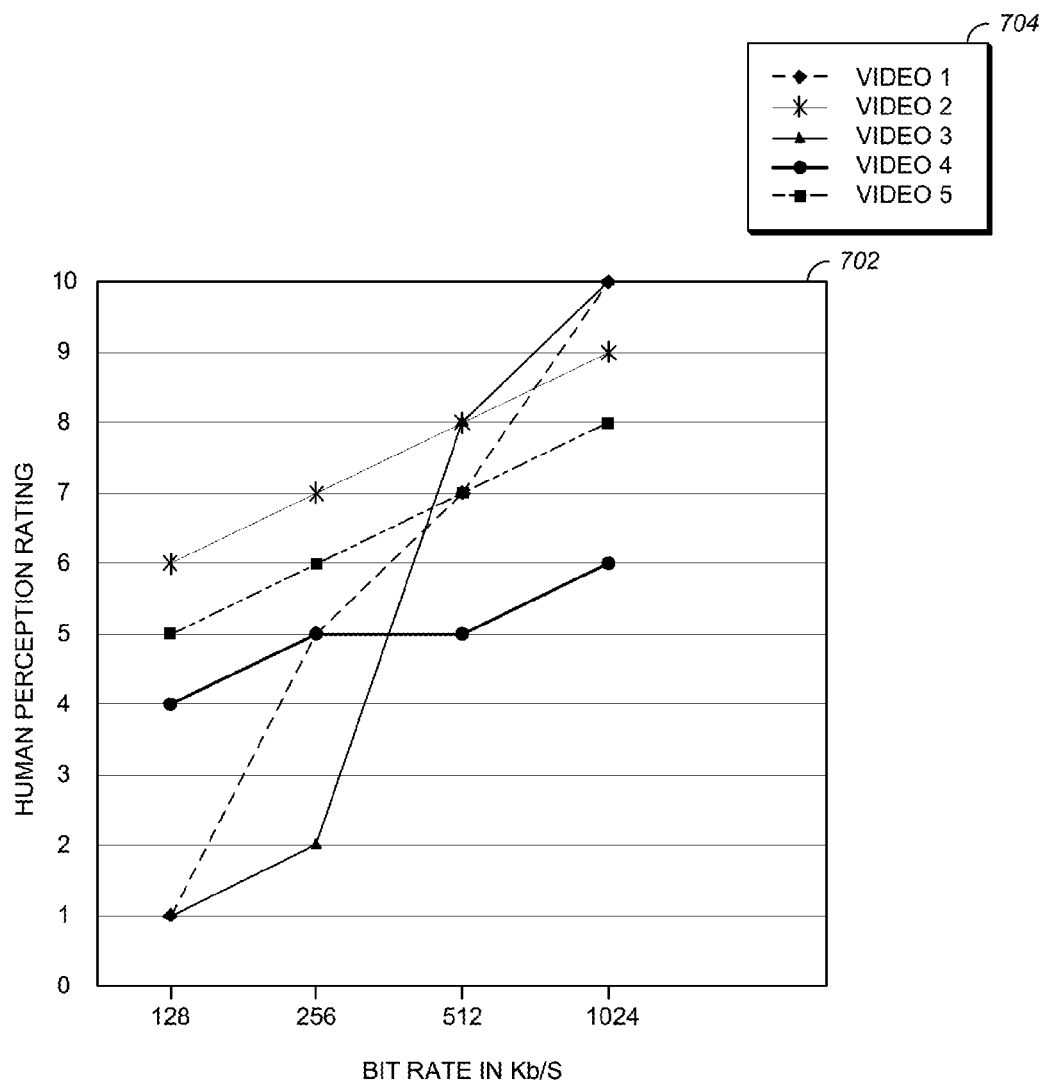
FIG. 7 is a graph of data points used to train a perceptual curve.

Once the data is collected these ratings will indicate the relative perceived quality of each video with its own set of unique characteristics at varying compression ratios. FIG. 7 depicts the data contained in the FIG. 6 database in graphical form. As seen in FIG. 7, as bit rate on the x axis increases, human perception ratings generally increase as well. However, because each video has a unique set of visual and/or audio characteristics, varying compression ratios have a varying affect on the perceived quality of each video. In this example, video 1 and video 3 showed the greatest improvement as bit rate increased while video 2 and video 4 showed the least amount of improvement in perceived visual quality as bit rate increased. Each video can have thousands of different content-based feature combinations that contribute to perceived visual quality. Some video features such as low frequency transform coefficients and video with a high degree of inter-frame movement are likely to encounter a more severe decrease in perceived quality as bit rate decreases. This is because the HVS is more aware of low frequency content as compared to high frequency content and more aware of content with a high degree of movement as compared to content with a low degree of movement. As illustrated by FIG. 7, videos that maintain relatively stable perception over a variety of bit rates are typically good candidates for an increased compression ratio and therefore increased bit savings because the lack of bits used to encode the video does not significantly degrade video quality as perceived by the HVS.

Once data from human evaluators has been collected, for example, as shown in FIG. 6, the data can then be used to train a prediction curve or function to accurately predict what a human evaluator would likely rate video content that was not tested previously. For example, a vector x as shown in equation (1) comprising all d video content-based features in a given video, together with corresponding human ratings y for each video can be used to train a prediction curve y' as shown in equations (2) and (3). Such functions f can provide a predicted rating value y' for any new video that is represented using the feature vector x and the coding bitrate. Various mathematical models can be used to train the prediction curve. In one exemplary embodiment, a regression function can be trained by the human rating database, for example as shown in FIG. 6. The regression function can be linear or non-linear. In some exemplary embodiments, the regression function is a linear equation as shown in equation (4) modeled as a function of video features with corresponding linear coefficients with varying weights. In other exemplary embodiments a machine learning algorithm such as PAMIR, a passive aggressive model for image retrieval, can be implemented in training the prediction curve. Furthermore, any other mathematical modeling or curve fitting tool can be used to train the prediction curve to accurately predict a human rating y' for a given set of video content-based features x.

With respect to the vector of video features x shown in equation (1), video content-based features can be represented by data corresponding to local binary patterns, motion vector information, transform coefficient frequency, histograms of colors in local sectors of a video frame or any other method of detecting content-based features in a video or image. For a detailed to discussion on how to represent various types of video content-based features with data, see for example "CVPR 2005" by Serre Wolf and Poggio, or "object recognition from local scale-invariant features" by DG Lowe. Furthermore, content features can be audio features represented by spectrograms, Mel frequency cepstral coefficients (MFCC's), stabilized auditory images, pitch distribution, harmonics, tempo or beat. See for example, Chechik et al., Neural Computation 2010.

For example, a local binary pattern feature can be created by scanning every image (video frame) and matching each block in the image to one of a plurality of predetermined texture patterns. A histogram of these patterns is then computed for every frame. One form of LBP uses binary texture patterns of 8 bits, hence the histogram would be of ($2^8$) 256 features. Similar approach can be used to collect color histograms.

Accordingly, each video contains an extensive array or vector x of d content-based features possibly of different types. Based on this extensive array of features, all features that make up a video stream can be represented as a feature vector x with d total dimensions representing each of the video features according to (1):

$$x \in R^d \qquad (1)$$

Figure 8:
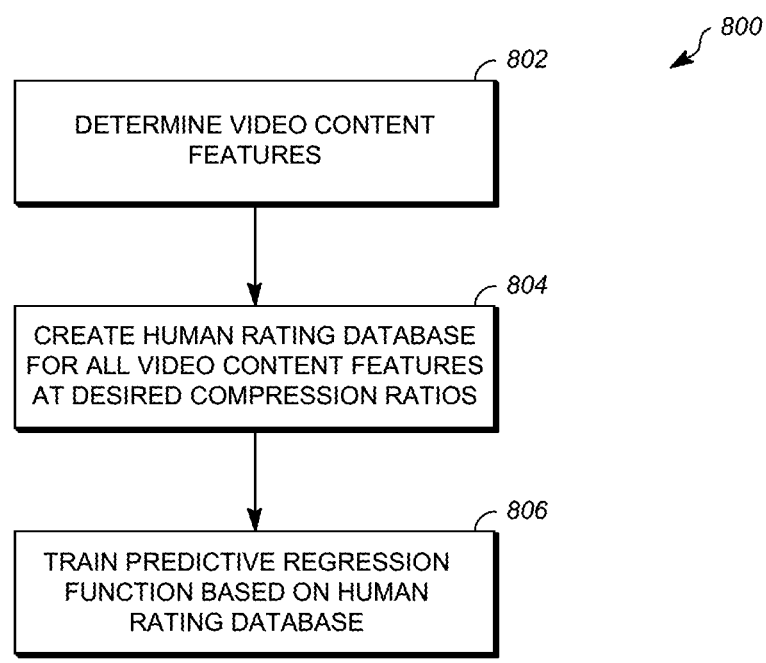
FIG. 8 is a logic flow chart of a process used to build the human rating database.

Given a vector x representing all content features of a video stream, human ratings y are collected for each data set x. This process is repeated for any number of videos with their own unique data set x. The more videos included in the process, the more accurate a trained function can become. Accordingly, the process of training a function can involve thousands of videos with thousands of corresponding vectors of video content-based features $x_i$ or more. Each human rating $y_{ik}$ will correspond to one or more vectors of video content data $x_i$ at a particular bit rate, $BR_k$. For example the number of different bit rates, k in FIG. 6 is set at 4 but any number of differing bit rates can be used. Referring to FIG. 8, each human rating $y_i$ is plotted against each vector of video content features $x_i$ at each bit rate k. Once all human ratings $y_{ik}$ have been collected for each vector of video content features $x_i$, at varying bit rates $BR_k$, a function $f_w$ is trained based on the data to learn the mathematical relationship between output $y_{ik}$ and inputs $x_i$ and $BR_k$. The output $y_{ik}$ of function $f_w$ is defined by equation (2):

$$y_{ik}' = f_w(x_i, BR_k, w) \qquad (2)$$

In equation (2), x, represents the d dimensional vector of features for an ith video, $y_{ik}$ is the human rating for the i-th video at bit rate k and $BR_k$ represents the bit rate of the ith video currently being rated. Alternatively, bit rate $BR_k$ can be included as a video feature in vector $x_i$ such that output $y_i'$ is defined by equation (3). Each video will be rated at multiple bit rates as shown in FIG. 6 and FIG. 7. Referring to equation (4), in which the regression function is linear, $w_d$ is a weight applied as a multiplicative coefficient to the video content features $x_d$. Together, all the w values (w1, . . . , wd) determine the exact shape of $f_w$, in equation (4):

$$y_i' = f_w(x_i) \qquad (3)$$

$$f_w(x) = w_1 x_1 + \ldots w_d x_d = <w, x> \qquad (4)$$

Alternatively, f can be a polynomial function or the logistic function according to equation (5):

$$f_w(x) = 1/(1 + \exp(-b<w, x>)) \qquad (5)$$

Alternatively, f can be another non linear function. For example, it can depend non linearly on x through a kernel function, or implemented using a neural network. In these cases the number of parameters w can be different from the dimension of the input d. For non linear regression approaches, weights are also assigned to combination of features. For example, a weight can be assigned to the product of the low-frequency content and the prominence of movement features.

In training a prediction curve, the parameters w for each video content feature $x_1 - x_d$ must be selected in such a way that will make $y_i'$ the most similar on average to the human ratings $y_i$, collected at step 804 in FIG. 8. This can be achieved using a data fitting technique such as standard least square regression. Generally, when a least square regression technique is used, the parameters of a model function are adjusted to best fit a data set. For example, least square regression can be used to adjust the function parameters in equation (4) to best fit the data set collected in FIG. 6. Using regression to train a function $f_w$ will enable the function to automatically predict the human rating $y_i'$ for future videos with their own unique set of content features without relying on actual human ratings collected manually.

Regression techniques fit a function $f_w$ such as equation (4) to a data set, such as a data set including content feature vector $x_i$, human rating $y_{ik}$, and bit rate $BR_k$. As stated above, bit rate can also be included in the content feature vector $x_i$. In that case, fitting linear equation (4) can be done by minimizing an error function that measures the misfit between the function $f_w(x_i, w)$ for any given value of w and the data points collected at step 604. The regression technique can use the sum of the squares of errors as the error function or any other suitable type of error function. If the regression technique uses the sum of the squares of errors as the selected error function, the error can be represented as shown in equation (6), where $x_1 \ldots x_n$ is the full set of n examples, each being a d-dimensional vector, and y is the set if n ratings corresponding to these examples.

$$E(w) = \frac{1}{2}\sum_{i=1}^{n} (f_w(x_i) - y_i)^2 \quad (6)$$

Figure 11:
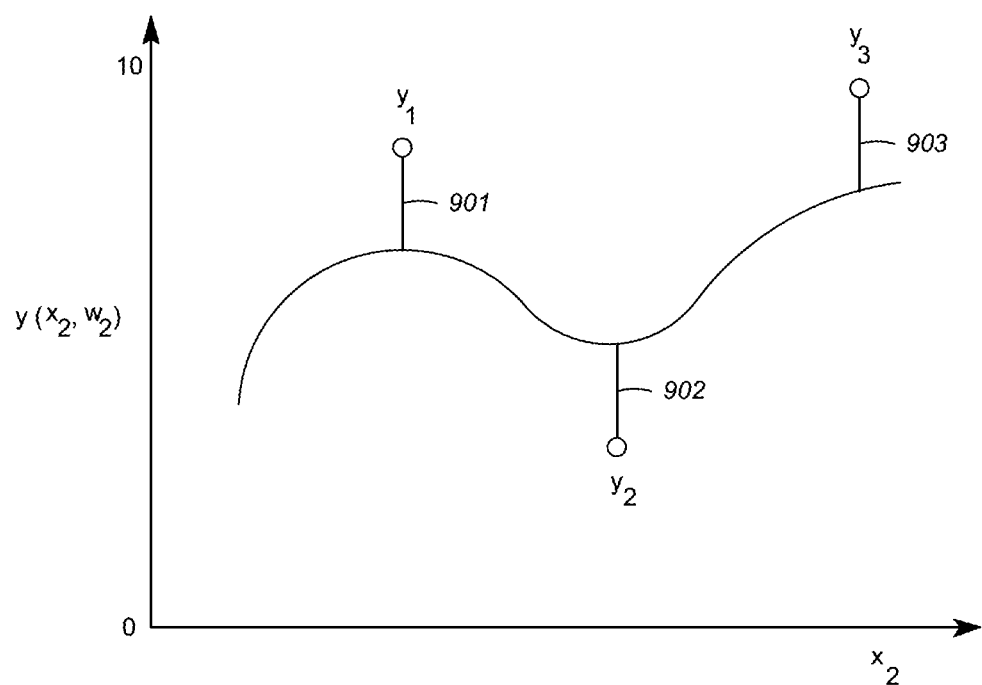
FIG. 11 is a graph depicts one aspect of a method for training a prediction curve.

As depicted in FIG. 11, error function (6) corresponds to one half the sums of the vertical displacements 901, 902 and 903. By minimizing vertical displacements 901, 902 and 903, error functions allow for the creation of a function that more accurately represents a given data set, such as the data set shown in FIG. 6. In equation (6), E(w) is a non-negative quantity that would be zero if and only if the function $f_w(x_i)$ passed through each training data point. Curve fitting is performed by choosing a value for w so that E(w) is as small as possible. The minimization of the error function occurs by selecting optimum w values. Although least square regression was used here, ridge regression, LASSO, support vector regression or any other suitable form of regression can be used.

A prediction curve such as in exemplary equations (2) or (3) can have functions such as exemplary equations (4) and (5) that can be trained for a large set of video content features such that each weight $w_1$-$w_d$ is continually updated for the most accurate prediction of a human rating. Each time the equation is compared with a data set corresponding to a video and a human rating of that video, the prediction curve can be further calibrated. In many cases, the subjective testing data shown in FIG. 6, will train each weight $w_1$-$w_d$ in the prediction curve to vary depending on its influence on a human rating. For example, a first video content-based feature $x_1$ in the feature vector x for example, can correspond to low frequency content while a second video content-based feature $x_2$ can correspond to high frequency content. It is known that in many cases, the HVS can more readily perceive differences in low frequency content relative to high frequency content. Accordingly, after prediction curve $f_w(x)$ has been trained, the coefficient $w_1$ corresponding to video feature $x_1$ can be greater than coefficient $w_2$ corresponding to video feature $x_2$ because of its relatively greater influence on the HVS.

Figure 9:
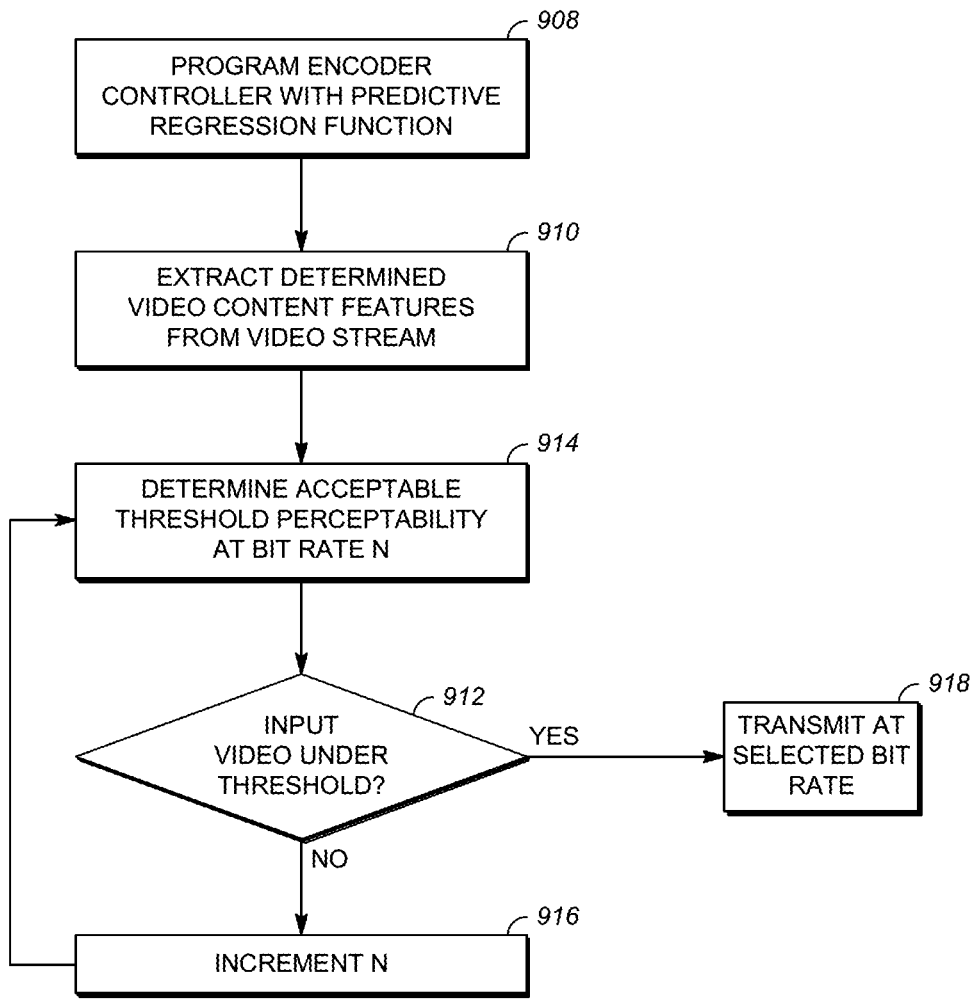
FIG. 9 is a logic flow chart of the process of selecting a bit rate.

Referring to FIG. 9, once the prediction curve has been trained, the prediction curve can be stored as a set of instructions in memory 16 to be executed by processor 14 at an encoder 40 step 908. Once the trained prediction curve $y_i'$ is implemented in encoder 40, encoder 40 can analyze a video stream 30 to be encoded at step 910 to determine the content characteristics of a video stream 30. The content characteristics can be determined in many different ways. For example, video features can be detected through a staged filtering process to identify stable points in scale space. Video features can also be detected by edge detectors, template matching procedures, space-time filtering, motion detection, or any other suitable feature detection method at feature detection stage 62 as shown in FIG. 3. Feature detection stage 62 can also detect audio features through filterbank techniques such as pole-zero filter cascade (PZFC) or through auditory image creation. The feature detection stage can analyze the video stream 30 on a frame by frame basis.

Figure 10:
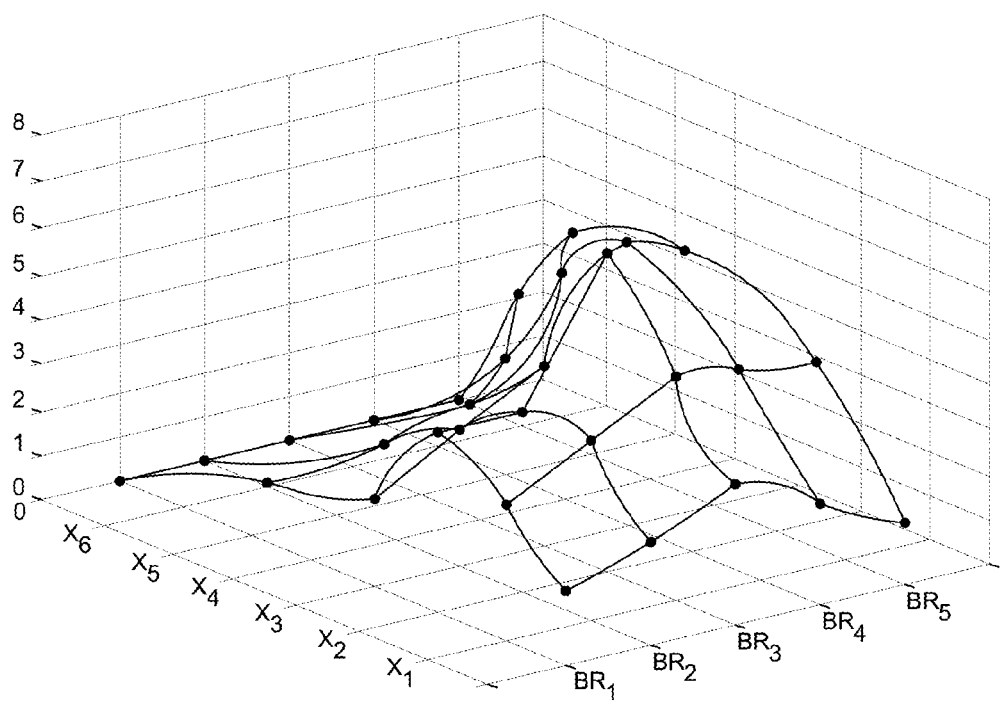
FIG. 10 is a graph depicting a prediction curve at varying bit rates.

Once the content characteristics of a video stream 30 are determined at stage 62, these determined characteristics can be used as an input to the trained prediction curve $y_i'$. For example, with respect to equation (3), once a vector of characteristics $x_i$ for a given video stream 30 are determined, the appropriate weight w determined from step 606 that is associated with each the of determined characteristics $x_i$ can also be input into equation (3). Once $x_i$ and w are input to equation (3), the trained prediction curve for those inputs can be simulated to predict the human rating for those inputs. In one aspect of a disclosed embodiment, the trained prediction curve can be simulated for a first vector of video characteristics $x_1$ associated with a first video stream 30. Furthermore, the prediction curve can estimate a human rating at multiple bit rates such as $BR_1$ and $BR_2$ as shown in FIG. 10. As seen in FIG. 10, the predicted human rating for a given set of characteristics such as $x_1$ can vary depending on bit rate. For example, a video could have a human rating of 3 with at BR1 and a human rating of 4 with BR2 for a given characteristic $x_i$.

Once a predicted human rating is given for a vector of video characteristics at one or more bit rates, encoder 40 can select a bit rate at which to transmit compressed bit stream 44. Preparing the encoder 40 to transmit at a specified bit rate can involve altering various aspects of the encoding process including but not limited to altering the frame rate of the video stream, altering the quantization parameter step size, performing zero bin alterations, altering motion vector values or various other suitable bit rate altering techniques.

Encoder 40 can select a bit rate, for example, by having a predetermined minimum human rating for all compressed bit streams transmitted. It should be noted that the regression described above can be used to interpolate the full continuum of bit values. The minimum human rating can also be computed real time based on conditions at the encoder or decoder. Specifically, encoder 40 can take all the predicted human ratings generated at step 914 as seen in FIG. 9 and compare them with a predetermined human rating such as a rating of 3.5. In this aspect of a disclosed embodiment, step 912 would reject BR1 as it does not result in the required human rating of at least 3.5. Step 912 can be implemented in a number of ways such as selecting the bit rate with the highest human rating available, selecting the bit rate with the lowest human rating above a predetermined threshold rating, or any other bit rate selection process that is based on a predicted human rating. Once a bit rate is selected, compressed bit stream 44 can be transmitted at the selected bit rate at step 918.

The embodiments of transmitting station 12 and/or receiving station 18 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, quantum or molecular processors, firmware, microcontrollers, servers, microprocessors, digital signal processors or any other suitable circuit. In the claims, the term "processor"

should be understood as encompassing any the foregoing, either singly or in combination. The terms "signal" and "data" are used interchangeably. Further, portions of transmitting station 12 and receiving station 18 do not necessarily have to be implemented in the same manner.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

Further, in one embodiment, for example, transmitting station 12 or receiving station 18 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 18 can, for example, be implemented on computers in a screen casting system. Alternatively, transmitting station 12 can be implemented on a server and receiving station 18 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 18 implementation schemes are available. For example, receiving station 18 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system, comprising:
   a memory to store executable instructions; and
   a processor, coupled to the memory, to execute the executable instructions to perform operations, comprising:
   identifying content-based features of a video stream;
   inputting, by the processor, the identified content-based features into a prediction function to predict a respective perceived quality rating for the video stream at a first, second, and third compression rate, wherein the prediction function is trained based on data collected from human evaluations rating a perceived quality of a set of video sequences at various compression rates and including various content-based features; and
   selecting one of the first, second, and third compression rates for the video stream based on a requirement of the perceived quality rating for the video stream satisfying a minimum rating.

2. The system of claim 1, wherein selecting one of the compression rates includes selecting the compression rate that is associated with a lowest perceived quality rating among the respective perceived quality ratings that is greater than or equal to the minimum rating.

3. The system of claim 1, the operations further comprising:
   encoding the video stream at the selected compression rate.

4. The system of claim 1, wherein the prediction function is trained using a regression function.

5. The system of claim 1, wherein the content-based features include at least one of: pixel frequency, pixel texture, color, brightness, or movement.

6. The system of claim 1, wherein the content-based features are represented by data corresponding to a set of binary patterns.

7. The system of claim 6, the operations further comprising:
   creating the set of binary patterns by scanning a set of video frames of the video stream and matching blocks in each of the video frames to predetermined texture patterns.

8. The system of claim 1, wherein the content-based features are represented by data corresponding to a motion vector.

9. The system of claim 1, wherein the content-based features are represented by data corresponding to a transform coefficient frequency.

10. The system of claim 1, wherein the content-based features are represented by data corresponding to a histogram of colors in a set of video frames of the video stream.

11. A method comprising:
    identifying content-based features of a video signal;
    predicting, by a processor executing computer executable instructions stored in a memory, respective perceived quality ratings for the video signal at different compression ratios based on the content-based features, wherein the predicting is based on data collected from human evaluations rating the perceived quality of a set of video signals at various compression ratios and including various content-based features; and
    selecting one of the different compression ratios for compressing the video signal based on a requirement of the perceived quality rating for the video signal satisfying a minimum rating.

12. The method of claim 11, wherein the predicting comprises:
    predicting a first perceived quality rating for the video signal at a first compression ratio based on the content-based features;
    predicting a second perceived quality rating for the video signal at a second compression ratio based on the content-based features; and
    selecting a compression ratio associated with a lowest perceived quality rating among the respective perceived quality ratings that is greater than or equal to a minimum perception quality score.

13. The method of claim 11, further comprising:
    compressing the video signal at the selected one of the different compression ratios.

14. The method of claim 11, wherein the predicting comprises training a prediction function using a machine learning regression function.

15. The method of claim 11, wherein the content-based features include at least one of pixel frequency, pixel texture, color, brightness, or movement.

16. The method of claim 11, wherein the predicting further comprises:
predicting a third perceived quality rating for the video signal at a third compression ratio based on the content-based features.

17. A non-transitory computer-readable storage medium comprising computer-readable instructions that, in response to execution, cause a computing system to perform operations, comprising:
receiving, by the computing system, information that relates sets of content-based features respectively associated with a plurality of videos, the information including data collected from human evaluations rating a perceived quality of the videos when compressed at varying compression ratios;
identifying content-based features of a video signal; and
predicting respective perceived quality ratings for the video signal at different compression ratios based on training a prediction function with the received information including the data collected from the human evaluations.

18. The non-transitory computer-readable storage medium of claim 17, the operations further comprising:
selecting one of the different compression ratios for compressing the video signal based on a requirement of the perceived quality rating for the video signal satisfying a minimum rating.

19. The non-transitory computer-readable storage medium of claim 17, the operations further comprising:
determining weights for respective content-based features included in the data collected that reflect their contribution to the perceived quality rating of the videos when compressed at varying compression ratios.

* * * * *